(12) United States Patent
Prost

(10) Patent No.: US 7,329,325 B2
(45) Date of Patent: Feb. 12, 2008

(54) METHOD OF MANUFACTURING A TIRE COMPRISING AT LEAST ONE INSERT

(75) Inventor: Pascal Prost, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 407 days.

(21) Appl. No.: 10/892,716

(22) Filed: Jul. 15, 2004

(65) Prior Publication Data

US 2005/0056357 A1  Mar. 17, 2005

(30) Foreign Application Priority Data

Aug. 4, 2003  (FR) .................................. 03 09621

(51) Int. Cl.
*B29D 30/10*  (2006.01)
*B29C 70/68*  (2006.01)

(52) U.S. Cl. .................. 156/114; 152/152.1; 152/210; 156/110.1; 156/123; 264/326

(58) Field of Classification Search ................ 156/111, 156/123, 133, 110.1, 75, 114; 152/152.1, 152/210
See application file for complete search history.

(56) References Cited

U.S. PATENT DOCUMENTS

| 4,895,692 A | * | 1/1990 | Laurent et al. ............. 264/326 |
| 6,113,833 A |   | 9/2000 | Ogawa |
| 6,514,441 B1 | * | 2/2003 | Tanaka et al. ............. 264/40.1 |
| 6,582,212 B1 |   | 6/2003 | Mitamura |
| 6,908,523 B2 | * | 6/2005 | Caretta et al. ............. 156/111 |
| 2003/0062994 A1 |   | 4/2003 | Morand et al. |
| 2004/0020583 A1 | * | 2/2004 | Zhu et al. ................. 156/110.1 |
| 2004/0134578 A1 | * | 7/2004 | Kleckner .................. 152/152.1 |

FOREIGN PATENT DOCUMENTS

| EP | 0 492 170 A1 | 11/1991 |
| GB | 2 265 586 A | 10/1993 |

* cited by examiner

*Primary Examiner*—Geoffrey L. Knable
(74) *Attorney, Agent, or Firm*—Cohen Pontani Lieberman & Pavane LLP

(57) ABSTRACT

A method of manufacturing a tire (3), which includes a crown (5) having a molded tread pattern, and at least one insert (6) with a position that is set relative to the molded tread pattern. The method includes building an uncured tire around a core (1), positioning the at least one insert (6) within the uncured tire in a position set relative to the core (1), positioning the core bearing the uncured tire and the at least one insert (6) in an external mold (10) according to a set azimuth (β), and molding the tire.

7 Claims, 3 Drawing Sheets

METHOD OF MANUFACTURING A TIRE COMPRISING AT LEAST ONE INSERT

FIELD OF THE INVENTION

The present invention relates to the manufacture of tires. More precisely, it relates to the manufacture of tires comprising one or more inserts disposed in the crown or in the tread of said tires.

BACKGROUND OF THE INVENTION

It is known to dispose inserts in tires. Such an insert may consist for example of a sensor, a stud for a tire designed to travel on ice, a reinforcing element or an added element consisting of an elastomeric material different from the material used in the zone of the tire under consideration.

The tread of a tire is generally patterned in more or less regular manner over its circumference to provide the tire with the desired functional characteristics. It is thus possible for the function of an insert to be influenced by local variations in profile, in the pattern of the tread in the zone where said insert is implanted. This may be the case, for example, with a pressure or temperature sensor which, depending on whether it is facing a block of the tread pattern or on the other hand a groove in the tread pattern, will be subject to different pressure or temperature conditions.

A known solution allowing precise positioning of an insert relative to the profile of the tread consists in introducing said insert after the tread molding operation, that is to say generally after vulcanisation of the tire. One disadvantage of this solution is that, as a function in particular of the shape, the size or the fragility of the insert, introduction thereof may be a delicate or even impossible operation. Furthermore, it is difficult to achieve a bond with the materials of the tire after vulcanisation. Moreover, this addition may have significant effects on the uniformity of the tire.

SUMMARY OF THE INVENTION

One object of the invention is to overcome at least some of the above-stated drawbacks, thereby allowing simple and reproducible manufacture of tires comprising one or more inserts located precisely relative to the tread of the molded tire.

This and other objects are attained in accordance with one aspect of the present invention directed to a method of manufacturing a tire (3), which includes a crown (5) having a molded tread pattern, and at least one insert (6) with a position that is set relative to the molded tread pattern. The method includes building an uncured tire around a core (1), positioning the at least one insert (6) within the uncured tire in a position set relative to the core (1), positioning the core bearing the uncured tire and the at least one insert (6) in an external mold (10) according to a set azimuth (β), and molding the tire.

The insert may be positioned within the uncured tire during building thereof or alternatively after building thereof.

Another aspect of the invention relates to a core for this method. The core comprises a first index capable of cooperating with a first complementary index of a drive member of the core during assembly of the uncured tire and comprising a second index capable of cooperating during molding with a second complementary index associated with the external mold. Preferably, the core is such that the first and second indexes constitute a single means.

The invention can also relate to a tire having a crown that comprises at least one insert, the tire being obtained by the method of the invention.

DETAILED DESCRIPTION OF THE DRAWINGS

Figure 1:
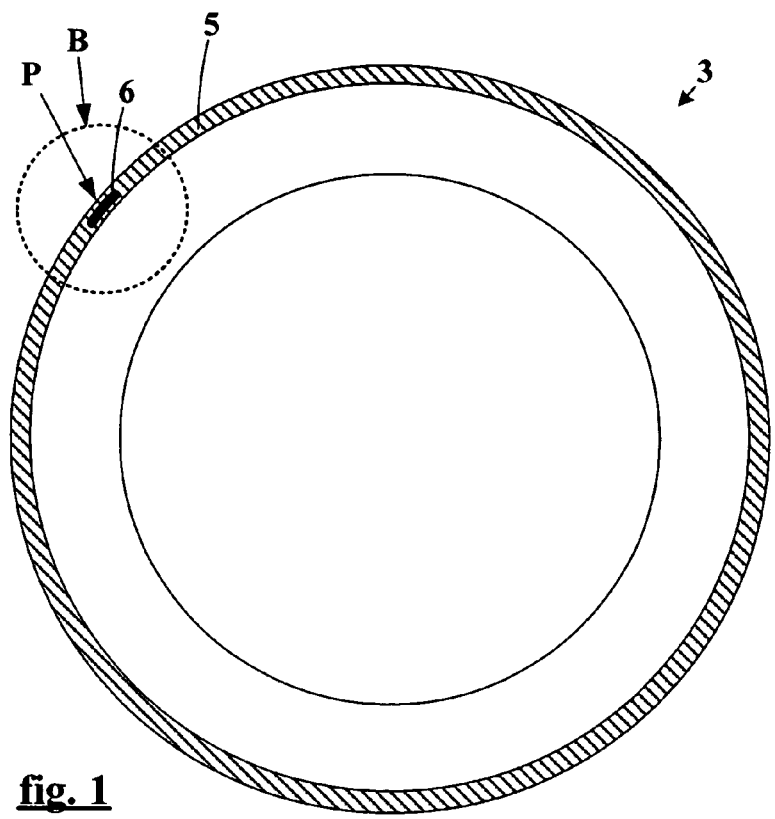
FIG. 1 is a schematic sectional view of a tire comprising an insert.

FIG. 1 shows a tire 3. The tire comprises a radially outer part (5), generally designated "crown". The crown 5 mainly comprises the tread and structural reinforcements. Inside the crown of this tire, there is disposed an insert 6 in a given position (P) relative to the crown 5.

Figure 2:
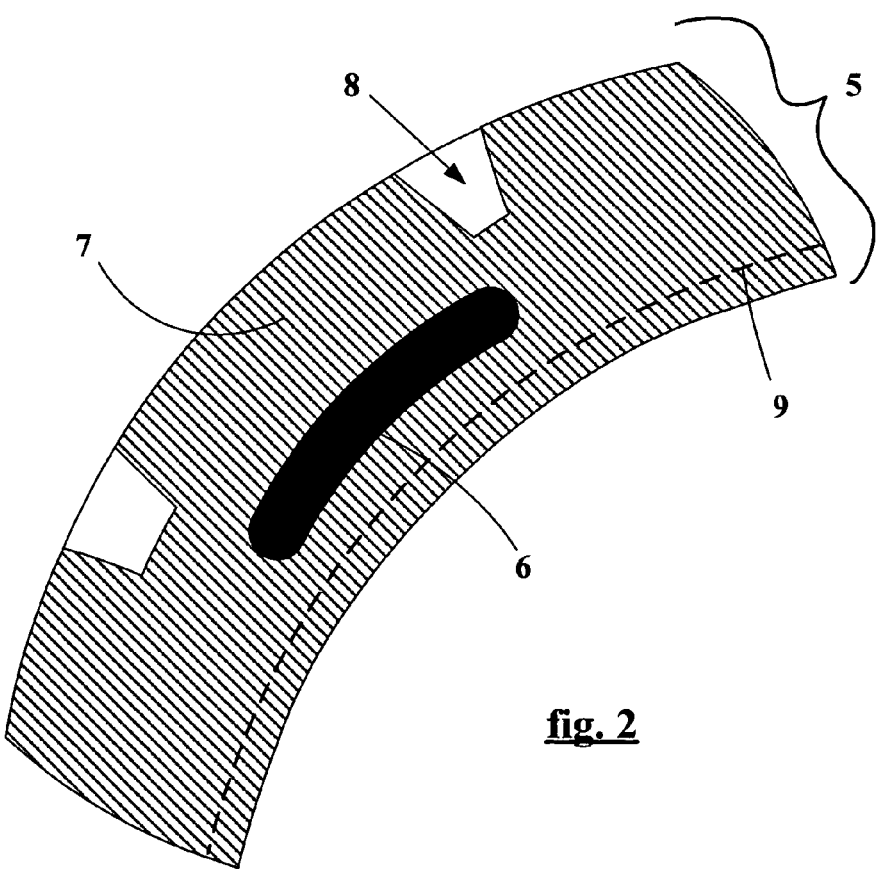
FIG. 2 is a detail view of the part of the tire contained in the circle B of FIG. 1.

FIG. 2 is a more detailed but still schematic view of the zone delimited by the circle B in FIG. 1. It shows the crown 5, the tread of which comprises protrusions 7 (generally known by terms such as "tread pattern ridges", "blocks" or "lugs") and recesses 8 (known generally by terms such as "grooves", "sipes" or "channels"). A dotted line shows the reinforcing structure 9 (carcass reinforcements, crown reinforcements or protective reinforcements which may be radial, biased or circumferential). The insert 6 is for example a sensor designed to measure the temperature in the tread. It will be readily understood that the function of the insert 6 is influenced by the greater or lesser proximity of protrusions and recesses (7, 8), that is to say by the actual position of the insert in the molded tire. An important aspect of the invention relates to reproducible positioning of the insert during mass production of such tires.

Figure 3:
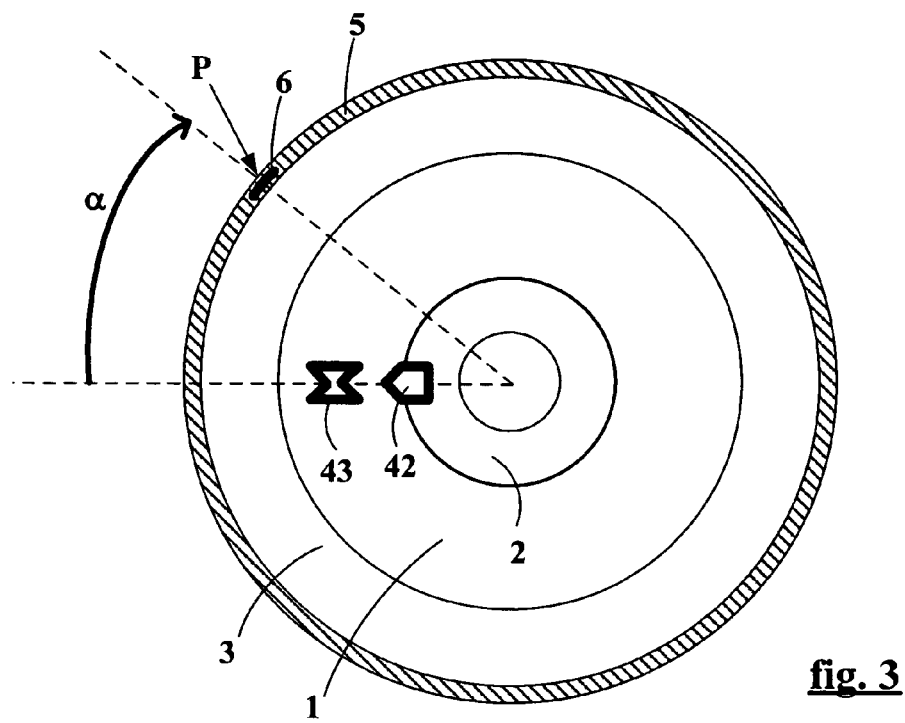
FIG. 3 is a schematic view showing the building principle according to the method of the invention.

FIG. 3 shows the tire of the preceding Figures during manufacture thereof according to the method of the invention. The uncured tire is built on a rotary core (1) by wrapping of long materials and/or successive deposition of short elements. The core 1 is driven by a drive member such as a spindle or hub (2). The position of the core 1 relative to the hub 2 is fixed by first indexing means (symbolised here by first indexes 42 and 43 complementary in form to one another). The angular position of the core during rotation thereof may therefore be controlled in relation to control of the various laying tools. Numerous indexing means are known, such as for example a keyway and key system or a coupling comprising a flat zone or any form of assembly allowing only a single relative angular position. The angular position of the spindle or hub 2 is controlled directly or indirectly in a manner known per se for example by means of an incremental coder.

Thus, when the insert 6 is positioned during the building process, its position (P) relative to the core 1 is reproducible. Said position P may be broken down into three elements which will now be listed:

The radial position of the insert (in the direction of tread thickness) is imparted by the building process, for example as a function of the thickness of the constituents deposited before the insert is itself deposited, The transverse position of the insert (in the axial direction of the tire), is likewise imparted by the building process and in particular by the axial position of the tool for laying the insert(s), Finally, the circumferential position of the insert (for example the azimuth α) relative to the core is controlled according to the invention through the intermediary of an indexing system, for example such as the indexing system described above.

When the uncured tire is fully assembled, that is to say when all its constituent elements (including the insert(s)) are in place on the core, this assembly (core+uncured tire) is placed in an external mold which imparts the final shape to the tire and particularly to the tread thereof.

Figure 4:
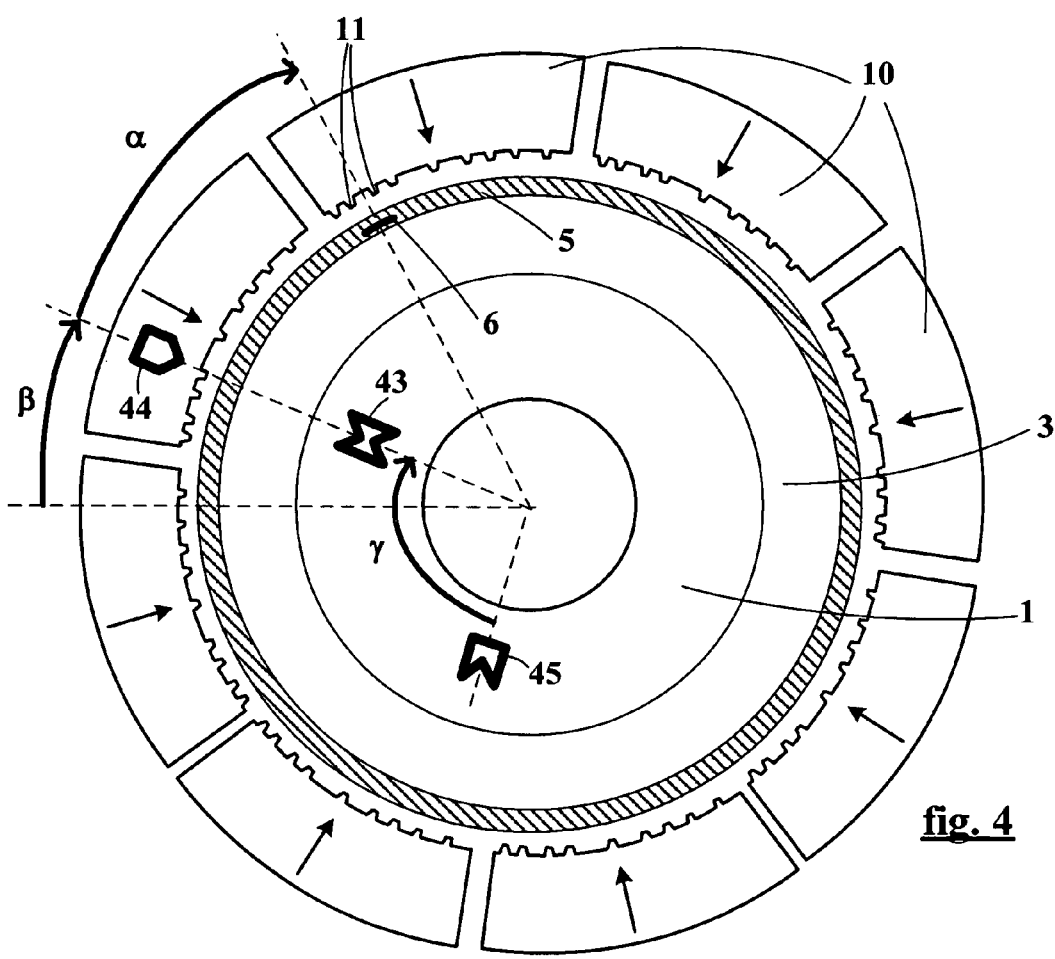
FIG. 4 is a schematic view showing the molding principle according to the method of the invention.

FIG. 4 shows the stage of the manufacturing process during which the uncured tire assembled on its core is placed in an external mold (symbolised here by molding sectors 10). The sectors 10 comprise protruding parts (11) intended to form recesses on the surface of the tire. To make the position of the insert 6 relative to the protrusions and recesses on the molded tread reproducible from one tire to another, the core bearing the uncured tire is positioned in reproducible manner relative to the external mold, that is to say here relative to the sectors (10). This may be achieved by way of second indexing means comparable to the first indexing means described above in relation to building. The second indexing means comprise a second index associated with the core and a second complementary index associated with the external mold. It is of course possible to use second indexes (44, 45) independent of the first indexes (42, 43). It is also possible to use the first index (43) associated with the core, said first index cooperating this time with the second complementary index (44) associated with the mold, provided that angular positioning of the tire in the mold is reproducible during the manufacturing cycles. In effect, it is perfectly clear from this Figure that any point at all of the core is fixed relative to the position P of the insert 6. It is thus possible to associate any (single) point of the core with any (single) point of the external mold so that the angular position of the insert in the mold is reproduced from one manufacturing cycle to another. Taking the example described in FIG. 4, where the second indexing means comprise the indexes 44 and 43, in each manufacturing cycle, that is to say in each tire manufactured, the insert 6 will be positioned with regard to the mold (which is here considered fixed) on the azimuth α+β relative to horizontal. On the other hand, if indexing during molding uses as second indexing means the combination of indexes 44 and 45, in each manufacturing cycle the insert 6 will be positioned with regard to the mold on the azimuth α+β+γ relative to horizontal since the index 45 is offset relative to the index 43 by an angle γ.

The second indexing means may also operate at the level of the tools (not shown) which are used to manipulate the core after the uncured tire assembly stage. In effect, a hub identical or similar to the hub 2 of FIG. 3 may serve to transport and/or position the core angularly within the mold. Second indexing takes place in this case via the centre and no longer the periphery of the core, as shown in FIG. 4.

Reproducible positioning may also be obtained in the following manner: since the core bearing the uncured tire is positioned in one and the same angular position at the end of each building cycle, the core is transported and placed in the mold avoiding any rotation thereof (or allowing rotation by a constant angle). This may be implemented simply, for example by translation on rails or by rotation by turntable from the building station to the molding station.

When the tread pattern of the tire (or the tread pattern part in question) comprises a structural unit which repeats two or more times over the circumference, that is to say when the insert may assume several positions for an identical effect, it is of course possible to use indexing means comprising a corresponding number of possible positions (or a sub-multiple of this number).

Figure 5:
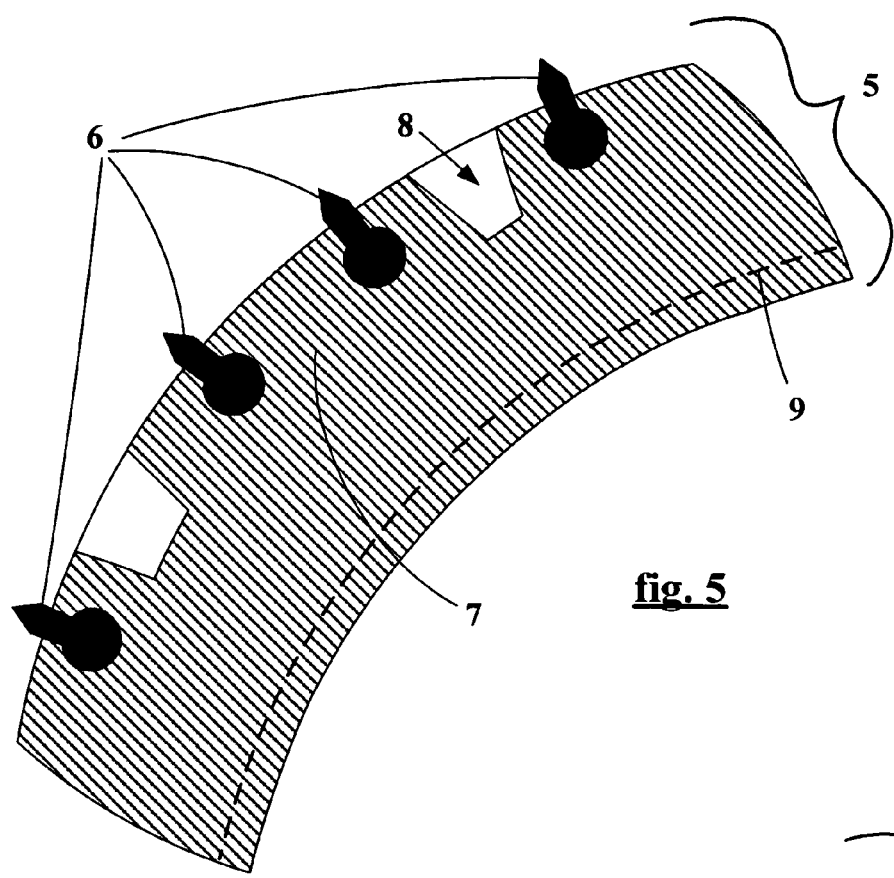
FIG. 5 is a detail view of a tire comprising inserts in the form of studs.

If, instead of positioning a single insert as described in the Figures, it is desired to position two or more inserts, the method described applies without any modification other than those necessary for positioning said inserts in the uncured tire. For example, it is possible to implement the method of the invention to manufacture studded tires, that is to say tires the tread of which comprises numerous protruding metallic inserts intended to improve grip on frozen ground. FIG. 5 relates to this situation. FIG. 5 shows the crown 5 of a tire equipped with inserts 6 in the form of ice studs disposed on the protrusions 7 of the tread pattern in a set arrangement. The corresponding mold (not shown) comprises recesses designed to accommodate the points of the studs during final molding.

The insert may be deposited between the various layers of materials during assembly of the tire but it may also be introduced into the uncured rubber at the end of building prior to the molding operation. That is to say that the insert may be positioned within the uncured tire during an operation subsequent to but independent of tire building proper.

Figure 6:
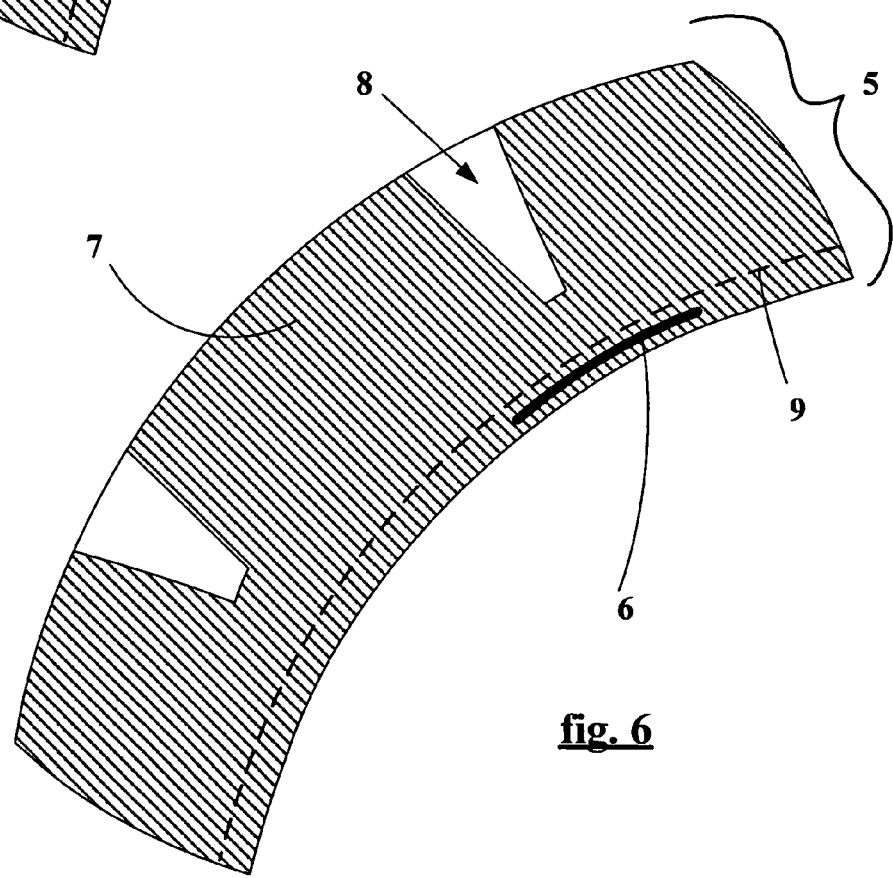
FIG. 6 is a detail view of a tire comprising an insert in the form of a sensor.

Conversely, the insert 6 may be positioned, right at the start of building, under the carcass reinforcements (9) or in the thickness of the tire inner liner. FIG. 6 relates to this situation and shows an insert (6) in the form for example of a pressure or deflection sensor, which is disposed in reproducible manner opposite a groove 8 in the tread.

The core (1) may assume various forms: it may be rigid, for example according to the teaching of document EP0242840, or more or less deformable (inflatable) in accordance with documents FR2005116 or EP822047, provided that it allows both building and molding.

Laying of the insert in the uncured tire may be effected in various ways depending on the type, shape and number of inserts. In particular, the insert may be deposited by a specific operation or on the other hand incorporated before laying in a larger complex such as a rubber strip.

It has been noted that the method of the invention allows a high level of consistency in the final positioning of inserts within the finished tires. The method of the invention may make it possible to obtain a scatter of less than or equal to 1 mm over the circumference of a passenger-car or motor-cycle tire.

In general, the term "tire" used in the present specification of course covers any type of resilient tire, whether pneumatic or non-pneumatic, the invention relating substantially to molding of this "tire" and not its operation.

I claim:

1. A method of manufacturing a tire comprising at least one insert, the method comprising:
   building an uncured tire around a core;
   positioning at least one insert within the uncured tire in a pre-selected position relative to the core;
   positioning the core bearing the uncured tire and the at least one insert in an external mold so that the core is disposed at a pre-determined azimuth relative to the external mold; and molding the tire with a tread pattern, the pre-determined azimuth being selected so that the at least one insert is disposed in a pre-determined position relative to the tread pattern.

2. The method of claim 1, wherein the at least one insert is positioned within the uncured tire during building thereof.

3. The method of claim 1, wherein the at least one insert is positioned within the uncured tire after building thereof.

4. The method of claim 1, wherein the at least one insert comprises a pressure sensor.

5. The method of claim 1, wherein the at least one insert comprises a temperature sensor.

6. The method of claim 1, wherein the at least one insert comprises a stud.

7. The method of claim 1, wherein the step of positioning the at least one insert within the uncured tire comprises positioning the at least one insert at a pre-selected azimuth relative to a first index for the core.

* * * * *